United States Patent [19]

Han

[11] Patent Number: 6,104,835
[45] Date of Patent: Aug. 15, 2000

[54] AUTOMATIC KNOWLEDGE DATABASE GENERATION FOR CLASSIFYING OBJECTS AND SYSTEMS THEREFOR

[75] Inventor: Ke Han, San Francisco, Calif.

[73] Assignee: KLA-Tencor Corporation, San Jose, Calif.

[21] Appl. No.: 08/970,951

[22] Filed: Nov. 14, 1997

[51] Int. Cl.$^7$ ...................................................... G06K 9/62
[52] U.S. Cl. ........................................... 382/225; 382/159
[58] Field of Search ................................... 382/224, 225, 382/159; 707/3–6

[56] References Cited

U.S. PATENT DOCUMENTS

| | | | |
|---|---|---|---|
| 5,060,277 | 10/1991 | Bokser ....................................... | 382/14 |
| 5,074,673 | 12/1991 | Sowell et al. ................................ | 356/5 |
| 5,161,204 | 11/1992 | Hutcheson et al. ......................... | 382/16 |
| 5,299,284 | 3/1994 | Roy ............................................ | 395/22 |
| 5,489,782 | 2/1996 | Wernikoff ................................. | 250/369 |
| 5,519,789 | 5/1996 | Etoh .......................................... | 382/225 |
| 5,537,491 | 7/1996 | Mahoney et al. ......................... | 382/218 |
| 5,638,465 | 6/1997 | Sano et al. ................................ | 382/281 |
| 5,696,844 | 12/1997 | Takagi ....................................... | 382/199 |
| 5,754,681 | 5/1998 | Watanabe et al. ........................ | 382/159 |

OTHER PUBLICATIONS

"A cluster based approach to robust regression and outlier detection", by Maiywan and Kashyap, IEEE Intl. Conf. on Systems, Man, and Cybernetics, Oct. 5, 1994, vol. 3, pp. 2561–2565.

"Biosignal pattern recognition and interpretation systems. 3. Methods of Classification", by Ciaccio, Dunn, and Akay, IEEE Engineering in Medicine and Biology Magazine, vol. 13, Issue 1, pp. 129–135, Mar. 1994.

*Primary Examiner*—Amelia Au
*Assistant Examiner*—Martin E. Miller
*Attorney, Agent, or Firm*—Skjerven, Morrill, MacPherson, Franklin & Friel LLP; Don C. Lawrence

[57] ABSTRACT

A method for automatically generating a knowledge database in an object classification system having a digital image data source, and a computer, includes the steps of inputting digital image data corresponding to a plurality of training images, and characterizing the digital image data according to pre-defined variables, or descriptors, to thereby provide a plurality of descriptor vectors corresponding to the training images. Predetermined classification codes are inputted for the plurality of training images, to thereby define object class clusters comprising descriptor vector points having the same classification codes in N-dimensional Euclidean space. The descriptor vectors, or points, are reduced using a similarity matrix indicating proximity in N-dimensional Euclidean space, to select those descriptors vectors, called extreme points, which lie on the boundary surface of their respective class cluster. The non-selected points interior to the class cluster are not included in the knowledge database. The extreme points are balanced by eliminating functionally redundant extreme points from each class cluster to provide a preliminary knowledge database. Fine tuning of the preliminary knowledge database is performed by either deleting extreme points that tend to reduce the accuracy of the database, or adding new rules which enhance the accuracy of the data base. Alternately, the fine tuning step may be skipped.

16 Claims, 7 Drawing Sheets

AUTOMATIC KNOWLEDGE DATABASE GENERATION FOR CLASSIFYING OBJECTS AND SYSTEMS THEREFOR

CROSS-REFERENCES TO RELATED APPLICATIONS

The present application is related to commonly owned, copending U.S. patent application Ser. No. 08/756,420 entitled METHOD FOR CHARACTERIZING DEFECTS ON SEMICONDUCTOR WAFERS, filed on Nov. 26, 1996, the disclosure of which is incorporated herein by this reference.

BACKGROUND OF THE INVENTION

1. Field of the Invention

This invention is related to object classification, and more particularly to a method and system for automatically generating a knowledge database for use in object classification systems.

2. Description of the Related Art

Classifying objects according to a pre-defined set of primitives, or attributes, is an important tool in quantifying characteristics associated with a sample object taken from a population of similar objects. In this regard, object classification is useful where the parent population is very large, for example, in categorizing and cataloging celestial images, or when the population is dynamic and its characteristics change over time, such as defects on semiconductor wafers, or magnetic disks, cataloging bacteria, and the like. Temporal or demographic shifts in object classes are identified by sampling objects, recording their attributes, and determining an object class appropriate to that object. In determining the object class of an object, a knowledge database ("KDB") typically compares the characteristics of an unknown object to the characteristics of pre-classified objects cataloged in the KDB. KDB's are generally encoded as machine readable code in a computer system, and the comparison is performed by a computer to automatically classify the unknown object.

Automatic classification of objects has been recognized by electronic device manufacturing companies as an important tool for significant improvement in identifying, and tracking device defects. The occurrence of certain defect types, for example, will indicate problems with raw materials such as contaminated feedstocks or process solvents, and other process problems such as air-born contamination, and the like. By analyzing defects as to type (or class), and frequency, steps may be taken to correct the cause of the defect, thereby enhancing product performance and competitiveness, and improving process yields.

Semiconductor defects, for example, include structural flaws, and process residues and other surface contamination which occur during the production of semiconductor wafers. Defects are typically detected by a class of instruments called defect scanners. Such instruments automatically scan wafer surfaces and detect, and record the location of optical anomalies using a variety of techniques. This information, or "defect map," is stored in a computer file and sent to a defect review station.

Using the defect map to locate each defect, a human operator observes each defect under a microscope and classifies each defect according to class (e.g., particle, pit, scratch, or contaminant). Information gained from this process is used to correct the source of defects, and thereby improve the efficiency and yield of the semiconductor production process. Problems with this classification method include the technician's subjectivity in identifying the defect class, and the fatigue associated with the highly repetitive task of observing and classifying these defects.

Methods of automatically classifying defects, collectively known as Automatic Defect Classification or "ADC," have been developed to overcome the disadvantages of manual defect classification. (ADC alternatively stands for Automatic Defect Characterization.) In conventional ADC, review stations are automated to load a wafer that has been mapped for defect location by a defect scanner. Once the mapped wafer is loaded, the review station:

1. positions the wafer to image the site of a defect, as indicated by the defect map;
2. focuses on the site of the defect;
3. captures a digital image of the site using a digital TV camera;
4. processes and analyzes the captured image of the site to locate the defect; and
5. further analyzes the data to classify the defect.

The above process is repeated for each defect (or a predetermined subset of defects) on the wafer. The wafer is then unloaded and the process is repeated for another wafer. By eliminating a fatiguing and highly repetitive task, such automated review stations reduce labor costs and provide improved consistency and accuracy over human operators.

Accordingly, an ADC system uses image processing techniques to first detect the defect and then to classify the defect according to the defect's physical characteristics. Comparing these physical characteristics to the physical characteristics of pre-classified defects in a KDB permits automated defect classification. While this system reduces technician fatigue, and increases the number of defects that can be classified per unit time, there is presently a problem with such KDB programs providing an accurate classification.

Generating a KDB for classifying objects typically utilizes direct coding methods, whereby an operator subjectively selects what are thought to be typical defects and enters the defect images and predetermined classification codes into a detection system to generate a knowledge database that is later used by an ADC system for classifying unknown defects.

A knowledge database generated by this method is inherently inaccurate since human variability, introduced in the initial subjective identification of the defect type, is included in the KDB. Moreover, present database generating methods, including direct coding, are time consuming and require a significant amount of highly trained, manpower resources.

Accordingly, there is a need for a method for automatically generating a KDB for classifying objects that does not require the manpower resources of presently known database generating methods, and that overcomes the subjective variability associated with KDB's of the prior art.

SUMMARY

The present invention is directed, in part, to a method for automatically generating a KDB from a set of training images and their predetermined classification codes for use in a nearest-neighbor based object classifier. The method includes using an image recognition machine readable code, or program, stored in a computer memory, such as ROM, RAM, optical disk, or magnetic disk. The machine readable code is implemented in a computer including a microprocessor and a main memory to receive, recognize and interpret each object image's physical characteristics in terms of a set of predefined variables, or descriptors to provide a descriptor vector for that object. The descriptor vector is stored in computer memory (RAM, disk, and the like). Where there are "N" descriptors, the characterization of each training image results in an N-dimensional descriptor vector. The resulting set of descriptor vectors, and their predetermined classification codes, may be represented as N-dimensional class clusters in N-dimensional Euclidean space, each class cluster representing a unique object class, and each descriptor vector comprising a point in an N-dimensional class cluster.

The automatic knowledge database generation program is stored as machine readable code in a memory (RAM, ROM, EPROM, or magnetic or optical disk). The automatic knowledge database generation program is retrieved from memory and executed by a computer to automatically generate a knowledge database useful for classifying objects of an unknown class using a nearest neighbor classifier. In the nearest neighbor classifier, an unknown input image is assigned a classification code equal to the classification code of the input image's nearest neighbor descriptor vector in the KDB. Advantageously, the automatic KDB generation method of this invention establishes and defines each class cluster by descriptor vectors residing on the class cluster boundary surface, thus simplifying the resulting KDB and enabling an efficient nearest neighbor classification process.

Each class cluster's boundary surface is defined by the "extreme points" of that class cluster (i.e., points determined to reside at the extreme edges, or boundaries, of the class cluster), thus limiting the number of descriptor vectors in that class to only those needed to define the N-dimensional class cluster surface in N-dimensional Euclidean space. An object having a descriptor vector falling within the interior of the class cluster boundary surface is classified with that class cluster's classification code. An object having a descriptor vector falling outside the class cluster boundary surface will receive a classification code equal to the classification code of the object's nearest neighbor extreme point associated with a proximal class cluster surface.

Following the extraction of extreme points for each N-dimensional class cluster, a balance process removes redundant extreme points based on their relative intra-class distances from one another, thereby providing a preliminary KDB. By removing redundant extreme points, the nearest neighbor classifier is simplified, and the efficiency of the classification process enhanced since calculation overhead is reduced.

Once the extreme points have been balanced, the preliminary KDB is fine tuned by adding and/or removing extreme points to provide the final KDB, thereby further increasing the accuracy of the classification process. As additional training images are supplied to the classification system, the automatic KDB generation system of this invention permits updating the KDB to consider including the information contained in the additional training images. Extreme points are thereby periodically added or dropped to accommodate dynamic changes in the nature and frequency of specific classes, which in turn changes the shapes of the N-dimensional class clusters.

Any population of objects that can be classified may be the subject of a KDB generated by the method of this invention. By way of example, to clearly illustrate the method of this invention and not by way of limitation, the method of this invention is described using, as objects, the defects on a semiconductor, a magnetic disk, and the like. Defects include cosmetic defects such as distorted patterns, or particles, nuisance defects, and defects that will effect product performance such as a shorted trace on an integrated circuit, a missing pattern, or a large particle. Other defect classifications may include corrosion, melted resist, glass flakes, and the like. It is understood that the method of this invention and the resulting knowledge database may be extended to include any classifiable population of objects.

In accordance with one aspect of the method of this invention, digital image data is inputted into a computer. An electronic camera, video recorder, CCD camera, active pixel display, or a scanned photograph may serve as the source of the digital image data. An artificial intelligence program and/or image processing program interprets the digital image data and characterizes the digital image data in terms of N pre-defined descriptors to provide an N-dimensional descriptor vector. For example, the semiconductor industry provides a standard set of descriptors for classifying common defect types typically encountered in that industry. Alternately, non-standard proprietary descriptors may be used to characterize the object represented by the digital image data. These descriptors are quantitative, or semi-quantitative, (e.g., discrete number, or open-ended ranges), permitting the classification system to calculate a numerical value for each of the descriptors. Accordingly, each descriptor represents a variable having a continuous value, a discrete value, or an open ended range value.

Quantitative descriptors generally relate to various characteristics of the object including size, porosity, eccentricity, and roundness, and are typically expressed in terms of the pixel qualities and characteristics associated with the original digital image. For example, a descriptor for the size of an object may include the number of pixels within a object's boundary. Descriptors relating to an object's porosity may include the number of object pixels divided by the total pixels within the object's area, the average intensity of the object pixels, the intensity standard deviation of object pixels, or the intensity contrast of an object boundary.

Each object image data used by the classification system to automatically generate a KDB is accompanied with a predetermined classification code. A set of object images and their respective predetermined classification codes comprises the input data set needed to train the system to generate the KDB using the method of this invention.

Each object class inputted to the automatic KDB generation system of this invention includes a plurality of pre-classified objects. Once each pre-classified object has been interpreted and characterized, the set of descriptor vectors associated with the plurality of objects for that object class may be depicted as an N-dimensional class cluster in Euclidean space. Each class cluster represents a specific object class, and each point in the class cluster represents an N-dimensional descriptor vector for an object in that object class.

In accordance with another aspect of the method of this invention only those points in each class cluster which represent the boundary surface of that class cluster are retained in the KDB, the remaining points interior to that class cluster being discarded. By keeping only these "extreme points," a nearest neighbor comparison of an unknown sample to the final KDB is simplified since comparisons are made to fewer points, and only to those points representing the maximum radial extension of that class cluster.

Identifying extreme points in a class cluster in N-dimensional Euclidean space using the method of this invention includes both inter-class and intra-class extreme point identification steps as follows:

1—Identify a class cluster pair.

2—For each pair of class clusters identify a descriptor vector (or "point") in one class cluster whose distance to a corresponding point in the other class cluster represents the smallest distance between any two points as between the two class clusters; i.e., the smallest inter-class distance, and select these points as extreme points (inter-class extreme points).

3—For each pair of class clusters identify a point in one class cluster whose distance to a corresponding point in the other class cluster represents the largest distance between any two points as between the two class clusters; i.e., the largest inter-class distance, and select these points as extreme points (inter-class extreme points).

By making the above described comparisons between all possible class cluster pairs, a set of extreme points may be extracted for each class cluster. Each of the extreme points represents a point closest or furthest to a corresponding point in another class cluster. As such, these extreme points represent points lying on the outer radial periphery of a class cluster, thus defining the boundary surface of each class cluster.

Additional extreme points are identified by calculating intra-class distances between extreme points and non-selected points within a class cluster. The distances are ranked and the non-selected point corresponding to the furthest distance from any extreme point is selected as an extreme point (intra-class extreme point). This process is repeated until a threshold value (e.g., a maximum number of extreme points per class cluster, or a percentage of the total number of points in a class cluster) is reached. The inter-class and intra-class extreme point extraction processes provide an initial set of extreme points for each class cluster. The remaining descriptor vector points remain non-selected. These processes simplify the KDB, and improve the efficiency by which an unknown sample may be classified, since the unknown point is classified by its proximity to only the extreme points, and precludes otherwise unnecessary comparisons to interior points of the class clusters.

In accordance with another aspect of the method of this invention, the extreme points of each class cluster are balanced by eliminating redundant extreme points; i.e., extreme points in such close proximity to one another in the same class that the marginal discrimination provided by the redundant extreme point is insubstantial. The balance process includes the step of measuring the proximity of all extreme point pairs in a class cluster, and determining whether extreme points are so close that some of the extreme points are redundant. In one embodiment the distances between each extreme point pair is measured and then ranked. The minimum distance among all extreme point pairs is compared to a predetermined cutoff value. If the distance is less than the predetermined cut-off value, that the extreme point pair having the minimum distance is identified for removing one extreme point in the pair.

In determining which point in the pair is to be discarded, the distance of each extreme point in the pair to its next nearest neighbor in that class cluster is calculated. The extreme point having the closest next nearest neighbor is discarded from the set of extreme points in that class cluster. The foregoing process is repeated until no distance between extreme point pairs satisfy the predetermined cut-off value. The balancing process results in a "preliminary" KDB. At this point in the process of this invention, extreme point are hereafter referred to as "rules," since each extreme point now potentially participates in determining the classification code of an unknown object. The balance process simplifies the classification process, and enhances the efficiency with which unknown samples are processed by the KDB and the classifier system of this invention.

In accordance with another aspect of the method of this invention, the KDB is fine tuned by deleting and/or adding extreme points to further increase the accuracy by which the classifier containing the KDB generated by the method of this invention discriminates between classes of unknown objects.

In accordance with another aspect of the method of this invention, each rule in each class cluster in the preliminary KDB is tested to determine whether it is a "good rule" or a "bad rule." A rule is good if there are few or no misclassifications associated with that rule.

In determining whether a rule is good or bad, the accuracy of each rule is ascertained by re-inputting the original training image set used to generate the KDB into the classification system, but without the predetermined classification codes, to thereby determine a system-generated classification code for each training image.

Ideally, the classifier containing the KDB generated by the method of this invention will classify each re-inputted image with a classification code to be equivalent to its pre-determined classification code. If the system classifies an image as belonging to a class different from its original classification code then the performance of the system is less than 100% accurate. In comparing the pre-determined classification code with the system-generated classification code, the system provides us with information important in identifying the causes of misclassification, such as identifying misclassified points, which class contains the most misclassified points, which rule in the preliminary KDB is responsible for the misclassification of points, and the magnitude of the misclassification.

A rule responsible for causing the misclassification of the points is identified by comparing the predetermined classification codes of the points associated with the rule, based upon the nearest neighbor classifier, with their system-generated classification codes. Ideally each rule will have associated with it only those training image points of the same class. However, a rule may now have associated with it some training image points having a system-generated classification code different from the predetermined classification code for those training image points.

A bad rule is identified by counting the percentage of misclassified points for each rule across all of the classes to thereby determine the accuracy of each rule. The rules are ranked according to the calculated percent accuracy, and the least accurate rule is deleted. The system accuracy then is calculated. If deleting the least accurate rule improves the system accuracy of the KDB, the system is further fine tuned by deleting another rule, adding a new rule, or simply stopping the fine tuning process, until no further improvement in system accuracy is discerned, or until a predefined system accuracy threshold is attained.

If there is no improvement in system accuracy after deleting the least accurate rule, additional rules may be selected for inclusion in the class clusters, thus further fine tuning the KDB and enhancing the discrimination of the KDB with respect to borderline unknown points. By selecting additional rules, ambiguities between two class clusters responsible for the misclassifications are resolved.

To add a new rule, the original training images are inputted into the classification system containing the preliminary KDB generated by the method of this invention without their predetermined classification codes. The points resulting from characterizing the images are inspected to determine which points have been misclassified by the system, and the degree of misclassification. The degree of misclassification is determined by the distance between the misclassified point and its nearest neighbor rule in the preliminary KDB. The distances between each misclassified point and its nearest neighbor rule across all of the rules in all classes are calculated. The point having the smallest distance between itself and its nearest neighbor rule (i.e., the most misclassified point) is selected and added to the KDB as a new rule with its original predetermined classification code. By keeping its original predetermined classification code, the newly selected rule effectively extends the boundary surface of its class cluster to include the new rule thereby enhancing the discriminatory power of that class cluster with respect to marginal unknown samples. The accuracy of each rule is calculated in order to identify any improvements in system accuracy resulting from adding the new rule. The system may continue to be further fine tuned by deleting a rule, adding another new rule, or simply stopping the fine tuning process, until either no further improvement in system accuracy is discerned, or until a predefined system accuracy threshold has been achieved.

The method of this invention permits fine tuning in either a supervised learning process, or an unsupervised learning process. In one embodiment, a supervised learning process takes the fine tuning process as far as sorting the rules with respect to accuracy, whereafter the engineer decides which rules to drop or add. In another embodiment, called an unsupervised learning process, the system determines which rules to drop or add according to a set of pre-defined criteria. For example, the system may be told to drop all least accurate rules in each class category, or alternately to drop only the least accurate rule across all of the class clusters. Regardless, the process is repeated until a pre-defined system accuracy threshold is obtained, or no further improvement in system accuracy can be discerned by additional fine tuning.

BRIEF DESCRIPTION OF THE DRAWINGS

These and other features, aspects, and advantages of the present invention will become better understood with regard to the following description, appended claims, and accompanying figures, where:

DETAILED DESCRIPTION

While the invention is described hereinbelow with reference to certain illustrated embodiments, in particular semiconductor related defects, it is understood that these embodiments are presented by way of example and not by way of limitation. The intent of the following detailed description is to cover all modifications, alternatives and equivalents as may fall within the spirit and scope of the invention as defined by the appended claims. For example, it is understood by a person of ordinary skill practicing the method and system of this invention that the knowledge database may be automatically generated using any population of objects whose members may be classified according to predetermined quantitative descriptors.

Figure 1A:
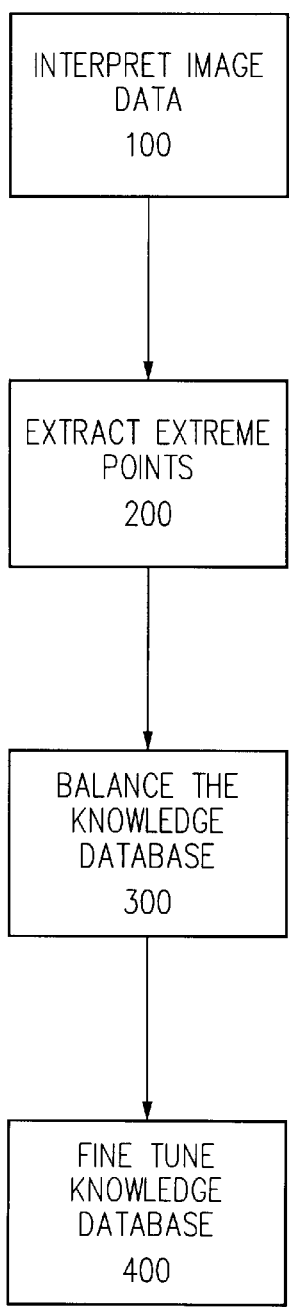
FIG. 1A is a flowchart of the principle processes of the method of this invention.
Figure 1B:
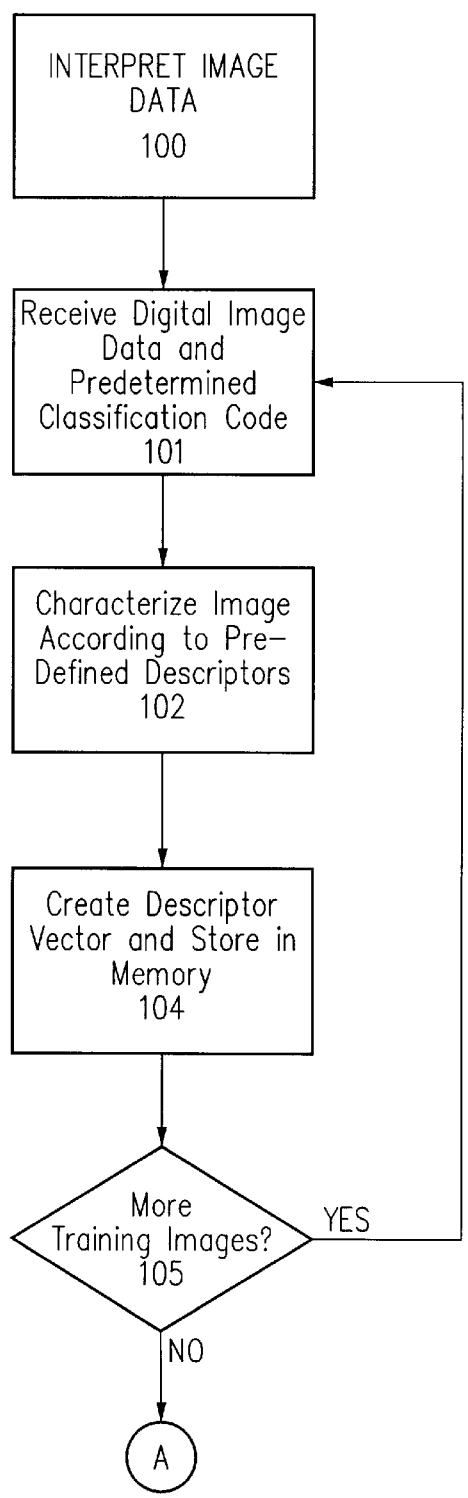
FIGS. 1B–1E are flowcharts showing the individual process steps of the method of this invention.
Figure 1C:
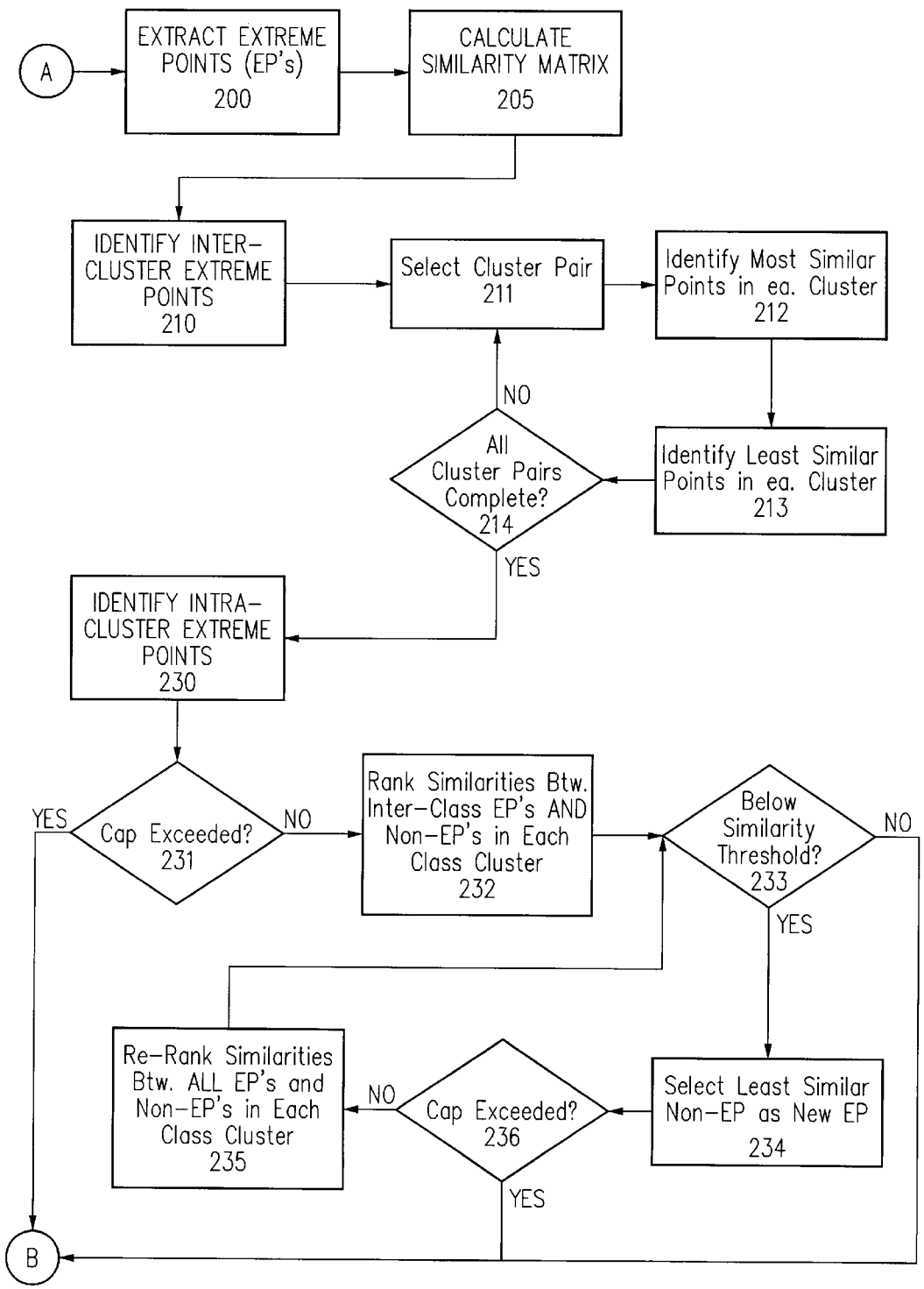
Figure 1D:
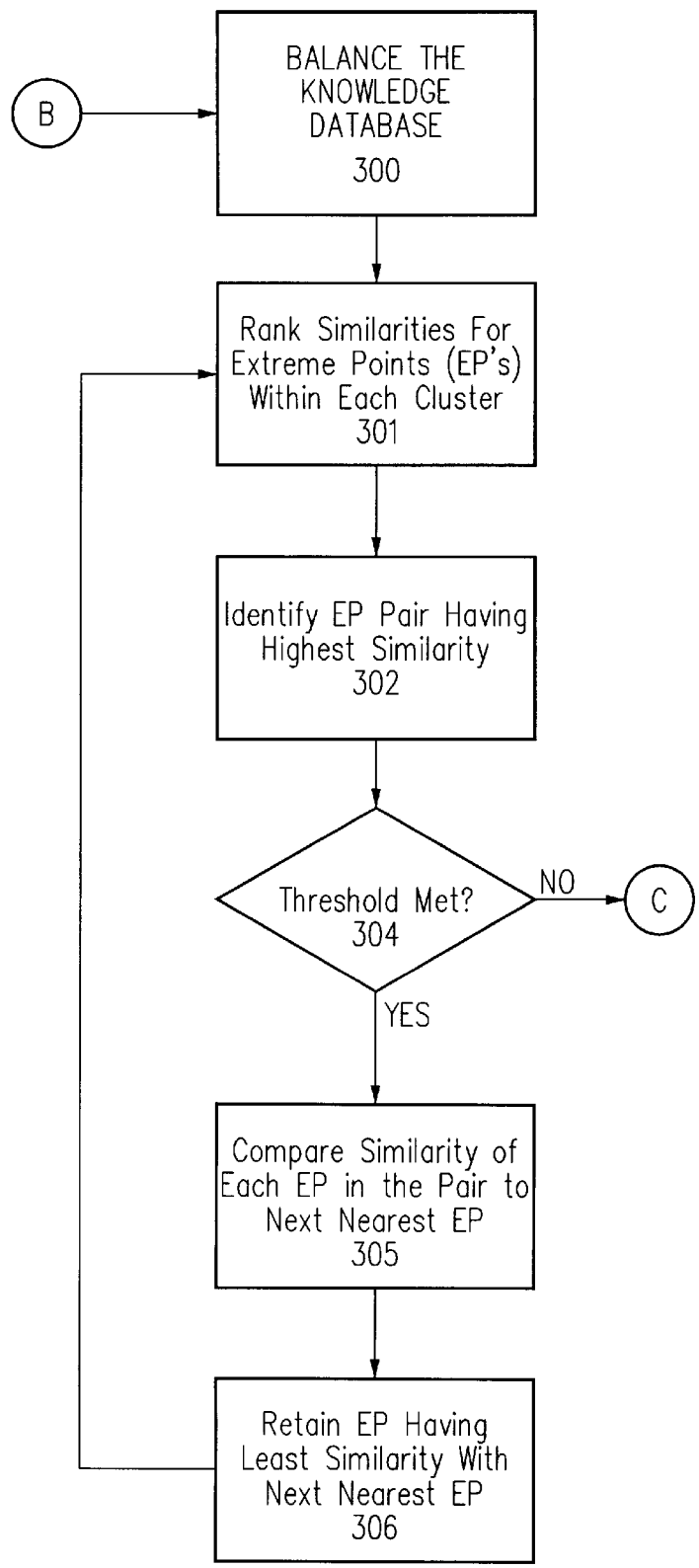
Figures 1, 1E:
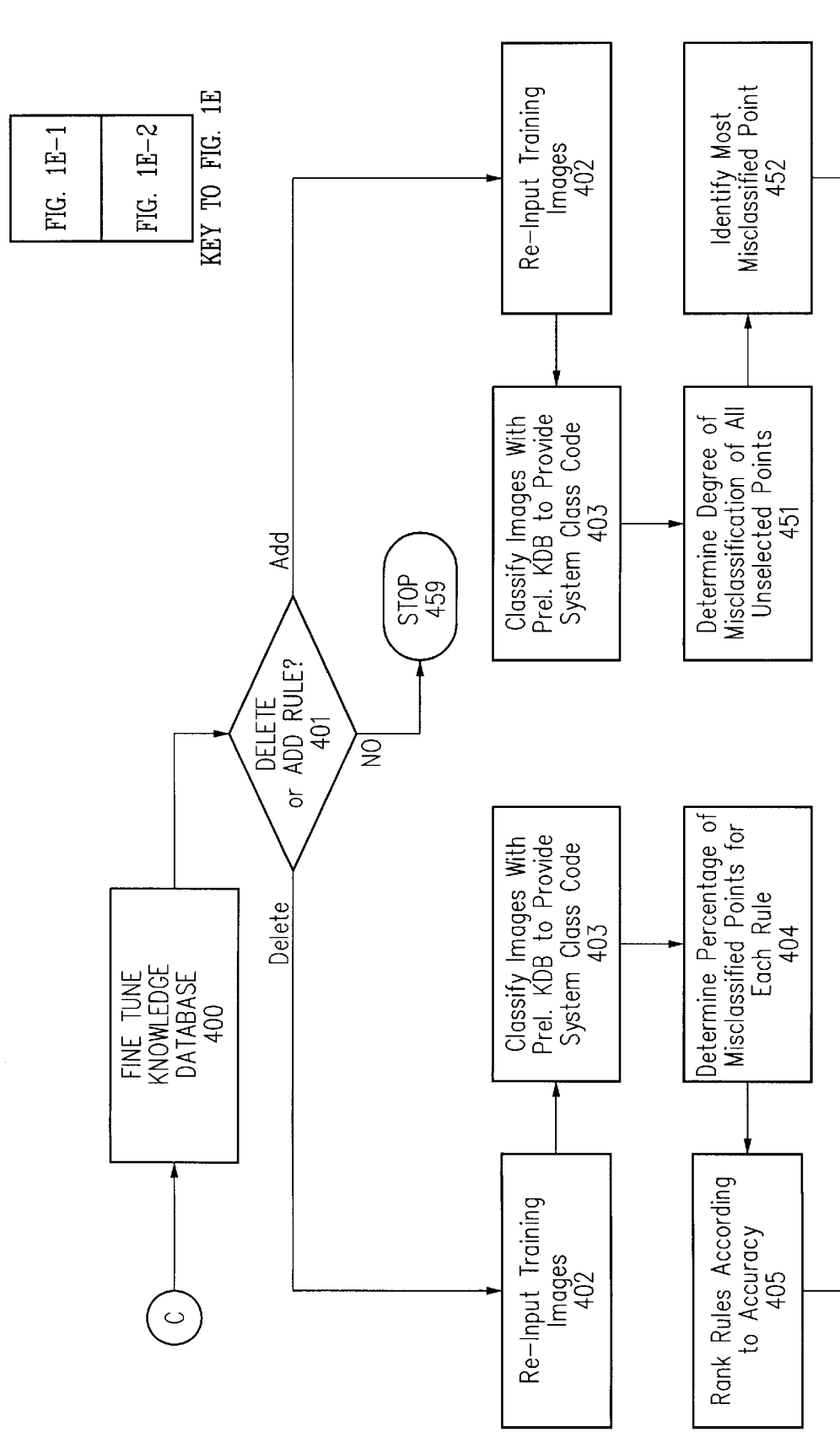

Referring now to FIG. 1 the method of this invention includes four principle operations or processes. Digital image data interpretation and object classification at process 100 includes inputting training images and their respective predetermined classification codes into the classification system, then characterizing each image represented by the digital image data in terms of N pre-defined descriptors to provide a descriptor vector for each image.

Extracting extreme points at process 200 reduces the number of descriptor vectors in the final KDB to only those necessary to identify the boundaries of class clusters. This simplifies the KDB and enhances the efficiency by which an unknown point is classified.

Balancing the extreme points in each class cluster at process 300 eliminates redundant extreme points for each class cluster, and provides a preliminary KDB. After the balancing process, the extreme points are referred to as "rules."

Fine tuning the KDB at process 400 enhances the accuracy of the preliminary KDB by either removing or adding new rules. The accuracy of the classifier containing the KDB generated by the method of this invention is measured by the classifier's ability to correctly classify the training images originally used to generate the KDB. The training images are re-inputted through the classifier without the pre-determined classification codes.

Referring now to FIG. 1B, interpreting the digital image data at process 100 includes receiving digital image data representing the training images of defects of interest, or other object, from a digital image source, such as a video camera, or output from a scanner, and optionally storing that data into memory at step 101. The digital image data includes the predetermined classification code associated with each original training image. An image processing or pattern recognition system works in cooperation with a digital image data characterization program to characterize the defects represented by the digital image data according to N pre-defined descriptors at step 102. The descriptors are quantitative in nature and includes variables or attributes used to describe the various semiconductor defects which may be encountered. The result of characterizing the defect represented by the digital image data is a descriptor vector N descriptors long. The descriptor vector and the pre-defined classification code for that defect are stored in memory (RAM, ROM, EPROM, magnetic disk, optical disk, and the like) at step 104.

The system then determines whether any remaining training images are to be processed at step 105, and if so, then the additional digital image data and predetermined classification are inputted at step 101. The subsequent steps are repeated until all training images have been inputted, interpreted, and the defects associated with the images characterized to provide N-dimensional descriptor vectors, which are stored in memory together with their predetermined classification codes.

The set of descriptor vectors having the same classification code creates a class cluster which may be represented as a "cloud" in N-dimensional Euclidean space. Some points in the N-dimensional class cluster will reside within the volume defined by the class cluster, and other points, called extreme points, will lie on and define the boundary surface separating the class cluster from the rest of N-dimensional Euclidean space.

A feature of the method of this invention is a "similarity matrix" whereby the proximity between points in N-dimensional Euclidean space is expressed in terms of their "similarity." The similarity of descriptor vector points in N-dimensional Euclidean space is an indication of the N-dimensional distance separating those two points. A similarity relating the distance between point "i" and point "j" is calculated according to the following equation:

$$\text{SIMILARITY} \equiv \frac{D_i \cdot D_j}{D_i^2 + D_j^2 - D_i \cdot D_j} \qquad \text{Eq. (1)}$$

Where:
$D_i$ is the descriptor vector representing point i in N-dimensional Euclidean space, and
$D_j$ is the descriptor vector representing point j in N-dimensional Euclidean space.

The method of this invention includes calculating similarities across all the descriptor vector points representing the original training images to create a similarity matrix. Table I below is an abbreviated example of a similarity matrix calculated with the formula of equation 1. The similarity matrix presented in Table I is simplified to better illustrate and clarify its concepts. It is understood by those practicing in the art that the similarity matrix resides in a computer memory as a number set with each similarity value indexed by its respective pair of descriptor vector points. Thus, as new points are added to the classification system, the similarity of each new point to the current points may simply be appended to the data in memory.

TABLE I

SIMILARITY MATRIX

| Points | 1 | 2 | 3 | 4 | 5 | 6 | 7 | 8 | 9 | 10 |
|---|---|---|---|---|---|---|---|---|---|---|
| 1 | 1 | 0.3 | 0.2 | 0.1 | 0.3 | 0.6 | 0.7 | 0.7 | 0.6 | 0.3 |
| 2 | 0.3 | 1 | 0.5 | 0.7 | 0.6 | 0.3 | 0.3 | 0.6 | 0.95 | 0.1 |
| 3 | 0.2 | 0.5 | 1 | 0.4 | 0.2 | 0.9 | 0.8 | 0.9 | 0.5 | 0.8 |
| 4 | 0.1 | 0.7 | 0.4 | 1 | 0.5 | 0.4 | 0.1 | 0.2 | 0.1 | 0.4 |
| 5 | 0.3 | 0.6 | 0.2 | 0.5 | 1 | 0.7 | 0.6 | 0.8 | 0.3 | 0.2 |
| 6 | 0.6 | 0.3 | 0.9 | 0.4 | 0.7 | 1 | 0.3 | 0.4 | 0.25 | 0.6 |
| 7 | 0.7 | 0.3 | 0.8 | 0.1 | 0.6 | 0.3 | 1 | 0.1 | 0.4 | 0.7 |
| 8 | 0.7 | 0.6 | 0.9 | 0.2 | 0.8 | 0.4 | 0.1 | 1 | 0.8 | 0.2 |
| 9 | 0.6 | 0.95 | 0.5 | 0.1 | 0.3 | .25 | 0.4 | 0.8 | 1 | 0.5 |
| 10 | 0.3 | 0.1 | 0.8 | 0.4 | 0.2 | 0.6 | 0.7 | 0.2 | 0.5 | 1 |

The similarities in Table I are symmetrical with respect to the diagonal. Clearly, the similarity of a point with itself is equal to 1, therefore each cell in the diagonal of the similarity matrix has a value of 1. The similarity value for each of the comparisons in the matrix is greater than 0 and less than 1 in accordance with the calculation of Eq. 1 for each pair of points. The closer the similarity is to 1 the closer the two points are together. The closer the similarity is to 0, the further apart the two points being compared are.

The similarity matrix, and the similarities provided for all of the points, permit us to identify and quantify the spatial relationships between descriptor vector points. Since a nearest neighbor classifier is used to identify descriptor vectors as belonging to one class or another, or to identify misclassified description vectors, the similarity matrix enables us to utilize the spatial relationship information provided by the similarity values for each point to extract both inter-class extreme points and intra-class extreme points. It also permits us to identify those extreme points least accurate in their ability to properly classify a sample. The similarity matrix for all of the descriptor vectors is calculated only once prior to the process of extracting extreme points. The same matrix is used in the extreme point extraction process, the KDB balancing process, and the fine tuning process of the method of this invention.

Extreme points are identified at operation 200, the method of which is shown in FIG. 1C. Prior to extracting the extreme points, a similarity matrix across all inputted training image descriptor vectors is calculated pursuant to Equation 1 at step 205. The process of identifying extreme points in a class cluster includes two separate sub processes: (1) identifying inter-class extreme points at step 210, and (2) identifying intra-class extreme points at step 230.

Identifying inter-class extreme points at step 210 includes the step of selecting a class cluster pair at step 211. For example, and now referring to FIG. 2, the class clusters associated with class 1, class 10 and class 24 are shown conceptually as separate regions in N-dimensional Euclidean space. Inter-class similarities between points have been previously calculated in the similarity matrix. Vectors $D_i$ and $D_j$ graphically show how each similarity is calculated according to Equation 1.

Referring to step 212 in FIG. 1C the two closest descriptor vectors, or points, in each class cluster pair are identified by examining the similarities of each point in the pair of class clusters and selecting the pair of points having the highest similarity. For example, in FIG. 2, as between class 1 and class 24 points C and E are the two closest descriptor vectors. As between class 1 and class 10, descriptor vectors B in class 1 and descriptor vector I in class 10 are the two closest descriptor vectors between those two class clusters. Similarly, descriptor vector J in class 10 and descriptor vector H in class 24 represent the two closest points in each of those class clusters. In identifying the two closest points in each pair of class clusters we have identified a descriptor vector point in each class that lies on the boundary surface of its associated class cluster. These points are selected as inter-class extreme points.

Figures 1, 1E, 2:
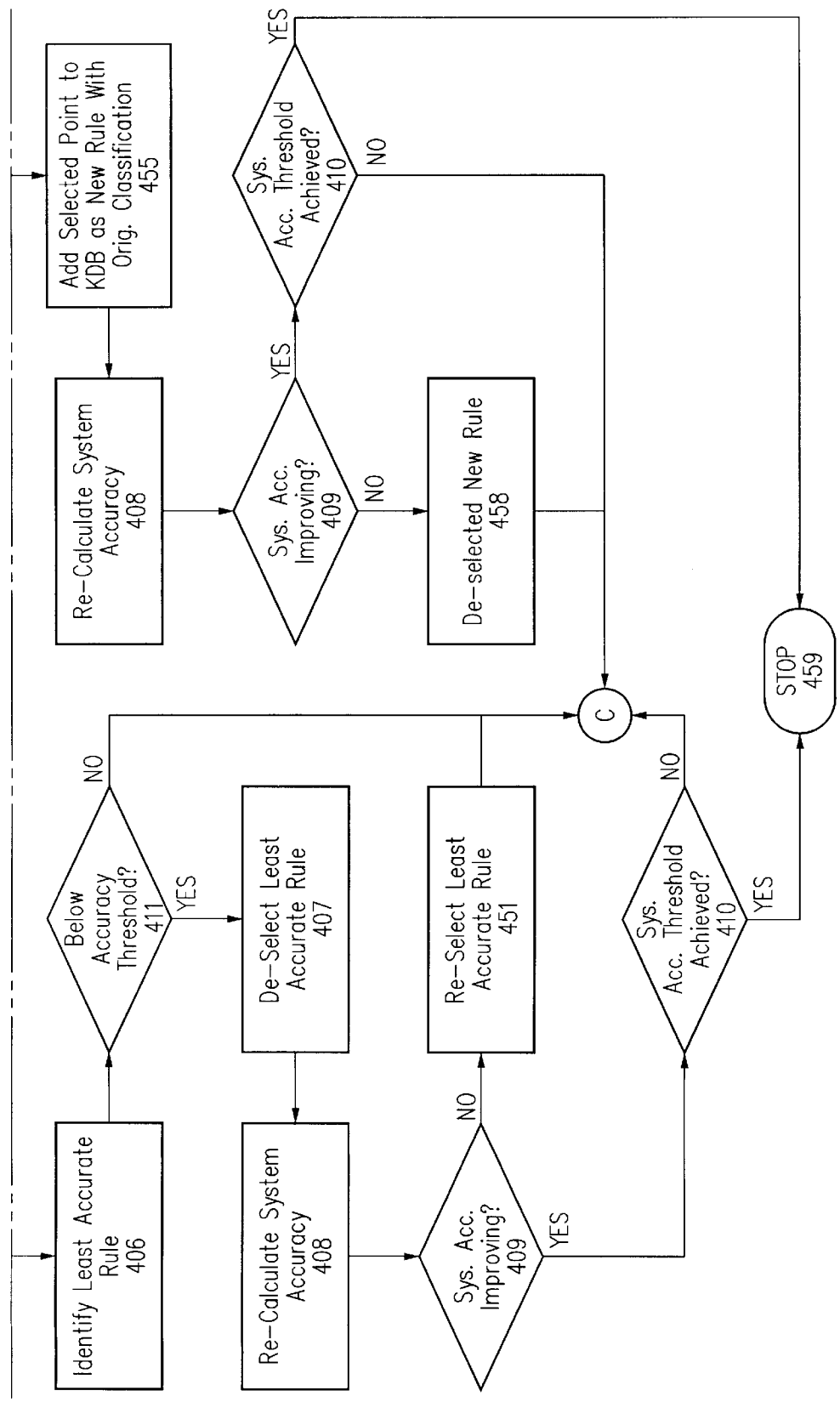
FIG. 2 is a conceptual chart showing a group of class clusters in N-dimensional Euclidean space.
Figure 2:
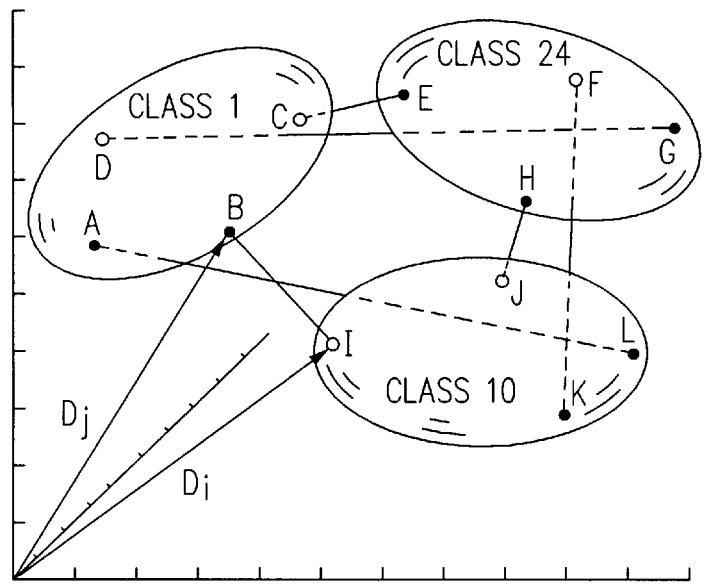

The similarity matrix previously calculated in FIG. 1C at step 205 includes the similarity of all combinations of the original descriptor vectors, thus permitting similarity comparisons across all points, across class clusters, and within class clusters. Table II below is an example of an inter-class similarity sub-matrix taken from the full similarity matrix calculated at step 205 in FIG. 1C. This example is presented to clarify and better illustrate the method of the present invention and not by way of limitation. The similarities between the class clusters representing class 1 and representing class 10, as shown in FIG. 2, are presented in the sub-matrix.

TABLE II

INTER-CLASS SIMILARITY MATRIX
CLASS PAIR = 1 AND 10

| Class 1 | Class 10 Points | | | | | | | | | |
|---|---|---|---|---|---|---|---|---|---|---|
| Points | 1 | 2 | 3 | 4 | 5 | 6 | 7 | 8 | 9 | 10 |
| 1 | .4 | 0.2 | 0.9 | 0.1 | 0.3 | 0.9 | 0.3 | 0.4 | 0.8 | 0.5 |
| 2 | 0.3 | 0.7 | 0.5 | 0.7 | 0.6 | 0.4 | 0.4 | 0.2 | 0.9 | 0.4 |
| 3 | 0.2 | 0.5 | 0.8 | 0.0 | 0.3 | 0.1 | 0.3 | 0.6 | 0.7 | 0.8 |
| 4 | 0.1 | 0.7 | 0.4 | 0.7 | 0.4 | 0.1 | ▓▓ | 0.3 | 0.4 | 0.6 |
| 5 | 0.3 | 0.6 | 0.2 | 0.5 | 0.6 | 0.9 | 0.7 | 0.2 | 0.8 | 0.9 |
| 6 | 0.6 | 0.3 | 0.9 | 0.4 | 0.7 | 0.5 | 0.6 | 0.7 | 0.1 | 0.9 |
| 7 | 0.7 | 0.3 | 0.8 | 0.1 | 0.6 | 0.3 | 0.4 | 0.6 | 0.2 | 0.4 |
| 8 | 0.7 | 0.6 | 0.9 | 0.2 | 0.8 | 0.4 | 0.1 | 0.3 | 0.8 | 0.2 |

TABLE II-continued

INTER-CLASS SIMILARITY MATRIX
CLASS PAIR = 1 AND 10

| Class 1 Points | Class 10 Points | | | | | | | | | |
|---|---|---|---|---|---|---|---|---|---|---|
| | 1 | 2 | 3 | 4 | 5 | 6 | 7 | 8 | 9 | 10 |
| 9 | 0.6 | ▓▓▓ | 0.5 | 0.1 | 0.3 | .25 | 0.4 | 0.8 | 0.2 | 0.6 |
| 10 | 0.3 | 0.1 | 0.8 | 0.4 | 0.2 | 0.6 | 0.7 | 0.3 | 0.5 | 0.4 |

For purposes of this example we are assuming that each of the class clusters is comprised of 10 descriptor vectors each. Column 1 of Table II corresponds to the descriptor points in the class cluster for class 1 and the descriptor vectors for class 10 are listed in the heading row.

The similarity for each of the comparisons in the matrix is greater than 0 and less than 1. The closer the similarity is to 1 the closer the two points are together. The closer the similarity is to 0, the further apart the two points being compared are.

Accordingly, we see that descriptor vector point 4 of class cluster 1, and descriptor vector 7 of class cluster 10 have the lowest similarity, that being 0.01. Accordingly, these two points represent the points furthest apart as between class cluster 1 and class cluster 10; therefore, they are identified as new extreme points in each of the respective class clusters.

Likewise, descriptor vector 9 of class cluster 1 and descriptor vector 2 of class cluster 10 have a similarity of 0.95 thus identifying these points as being the closest points as between the two class clusters. The furthest points are identified in FIG. 2 as point A in class cluster 1 and point L in class cluster 10. The closest points have been labeled B in class cluster 1 and I in class cluster 10, also in FIG. 2. The vectors associated with calculating the similarity of the descriptor vectors associated with points B and I are also shown in FIG. 2. The descriptor vectors, $D_i$ and $D_j$, represent each of the respective points in N-dimensional Euclidean space. As we now have the two descriptor vectors $D_i$ and $D_j$, the similarity between point B and point I, may be determined.

Referring to FIG. 1C, at step 212, inter-class extreme points are selected by identifying the descriptor vectors closest to one another across class cluster pairs, as indicated by the pair of points across each class cluster having the largest similarity in the similarity matrix. For example, in FIG. 2, as between class 1 and class 10, descriptor vector B in class 1, and descriptor vector I in class 10 represent the two points in those classes which are closest to one another, and they are therefore selected as extreme points. These extreme points necessarily lie on the boundary surface of their respective class clusters. Similarly, the same process is performed as between classes 1 and 24, and classes 10 and 24. As between classes 1 and 24, point C is closest to point E. As between class 10 class 24, and point J is closest to point H.

Also, referring to FIG. 1C at step 213, additional extreme points are selected by identifying the descriptor vectors in each class cluster pair that are furthest away from one another, as indicated by the pair of points across each class cluster having the smallest similarity. For example, in FIG. 2 as between class 1 and class 10, descriptor vector A in class 1 and descriptor vector L in class 10 represent the two points in those classes that are furthest away from one another, and are therefore selected as extreme points. These must also lie on the boundary surface of their associated class cluster. The same process is performed between class 10 and 24 thereby identifying descriptor vectors K and F as extreme points for classes 10 and 24 respectively. As between class 1 and class 24 descriptor vector D in class 1 and descriptor vector G in class 24 represent the two furthest descriptor vectors between those two classes and therefore identify them as extreme points residing on the boundary surface of their respective class cluster. Collectively, they define the class cluster's boundary surface thereby permitting a nearest neighbor determination of the classification code of an unknown sample. If the unknown descriptor vector lies outside of the boundary surface defined by these extreme points it will receive the classification code associated with the class cluster having an extreme point most similar to the unknown sample point. An unknown sample point identified to lie within the N-dimensional envelope defined by the extreme points of the same class cluster will receive the classification code associated with that class cluster.

The system determines whether all class cluster pairs have been completely analyzed for inter-class extreme point extraction at step 214. If all class cluster pairs have not been analyzed for inter-class extreme points, the foregoing steps are repeated beginning with step 211 until all pair combinations are completed.

Once all inter-class extreme points have been identified, additional extreme points for each class cluster are identified by the intra-class extreme point identification process at step 230. Intra-class extreme point identification includes identifying additional extreme points within a class cluster that are furthest away from previously selected extreme points.

The selection of additional extreme points is limited by a "point cap" at step 231. The point cap is defined as a percentage of the total number of descriptor vectors available in that class cluster, a minimum number of extreme points to be selected in a class cluster, a maximum number of extreme points to be selected in a class cluster, or a combination of these criteria. The point cap limit is applied after the inter-class extreme point selection process and serves to limit the number of additional extreme points that may be selected during the intra-class extreme point extraction process. The selection of too many extreme points from a class cluster renders the KDB trivial, and creates a convoluted class cluster boundary surface.

In one embodiment, the point cap is defined as an absolute number, or a percentage of the total number of descriptor vectors available in that class cluster, typically ranging from 10% to 50% of the total number of descriptor vectors within that class cluster, or a combination of these criteria. Where the inter-class extreme point identification process steps have exhausted most of the descriptor vectors within a class cluster, the cap may already be exceeded prior to beginning the intra-class extreme point identification process. In this case, the intra-class extreme point identification process is skipped.

Referring to FIG. 1C, the automatic KDB generation system of this invention determines whether the point cap is exceeded prior to beginning the intra-class extreme point identification process at step 231. If the cap is already exceeded then the intra-class extreme point identification process is skipped. If the cap has not been exceeded, the similarities of all the extreme points and non-selected points within a class cluster are retrieved from the previously calculated similarity matrix and are ranked at step 232. The non-selected point having the lowest similarity to any extreme point in the same class cluster is identified, and its similarity value compared to a similarity threshold value at step 233. If that non-selected point's similarity value is less than the similarity threshold value, the non-selected point is selected as an intra-class extreme point.

The similarity threshold value represents a predefined minimum similarity between a non-selected point and an extreme point pair. This avoids selecting an additional extreme point whose proximity to a pre-existing extreme point renders the two points redundant. Also, the similarity threshold value further limits the number of extreme points that may be selected by the intra-point extreme point extraction process.

At step 236, the number of extreme points selected in a class cluster is compared to the point cap established at step 231. If the point cap is exceeded, the intra-class extreme point extraction process is terminated. If the point cap is not exceeded, the similarities between the remaining non-selected points and the extreme points in the class cluster are re-ranked at step 235. The process is repeated beginning at step 233 until either the point cap or the similarity threshold value is violated, upon which the intra-class extreme point extraction process is terminated.

Figure 3:
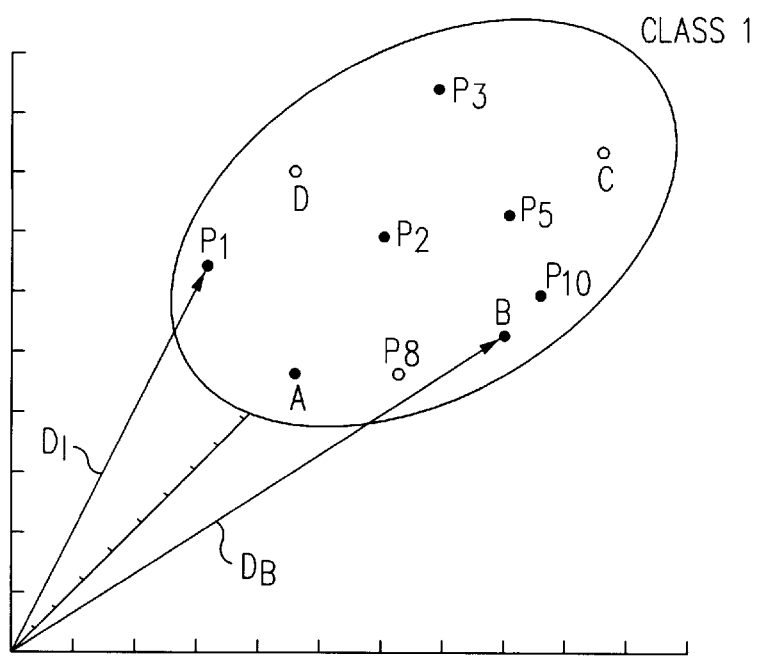
FIG. 3 is a conceptual chart showing a class cluster in N-dimensional Euclidean space.

The intra-class extreme point identification process is shown conceptually in FIG. 3. Extreme point B is shown compared to non-selected point P1. The similarity relating the distance between extreme point B and non-selected point P1 is calculated according to Equation (1) supra and is included in the similarity matrix previously calculated prior to commencing the extreme point extraction process. FIG. 3 conceptually shows the descriptor vectors, $D_B$ and $D_1$, by which the similarity is calculated as between extreme point B and non-selected point $P_1$ in class cluster 1. Here, $D_1$ is the descriptor vector representing point $P_1$ in N-dimensional Euclidean space, and $D_B$ is the descriptor vector representing extreme point B in N-dimensional Euclidean space. As we have the two descriptor vectors, $D_1$ and $D_B$, we are able to calculate the similarity.

Table III below is a sub-matrix of the full similarity matrix calculated for each of the extreme points A, B, C and D of FIG. 3 as compared to each of the non-selected points in class cluster 1. Each extreme point is compared to the non-selected points in that class cluster.

TABLE III

INTRA-CLASS SIMILARITY MATRIX
CLASS 1 POINTS

| Extreme Point | Remaining Descriptor Vectors | | | | | |
|---|---|---|---|---|---|---|
| | 1 | 2 | 3 | 5 | 8 | 10 |
| A | 0.2 | 0.3 | 0.6 | 0.5 | 0.9 | 0.9 |
| B | 0.7 | 0.4 | 0.6 | 0.1 | ░░░ | 0.3 |
| C | 0.2 | 0.5 | 0.6 | 0.2 | 0.8 | 0.6 |
| D | 0.1 | 0.5 | 0.7 | 0.4 | 0.9 | 0.6 |

The similarities of Table III are retrieved from the similarity matrix calculated at step 205 of FIG. 1C. The highlighted cell in Table III indicates the point $P_8$ furthest away from the extreme point B. The number of extreme points selected is dependent upon the predetermined point cap, and on whether the identified candidates have a similarity below a predetermined similarity threshold value. If the point cap is not exceeded, and if the similarity of point $P_8$ is less than the similarity threshold value, point $P_8$ is selected as an additional extreme point.

Figure 4:
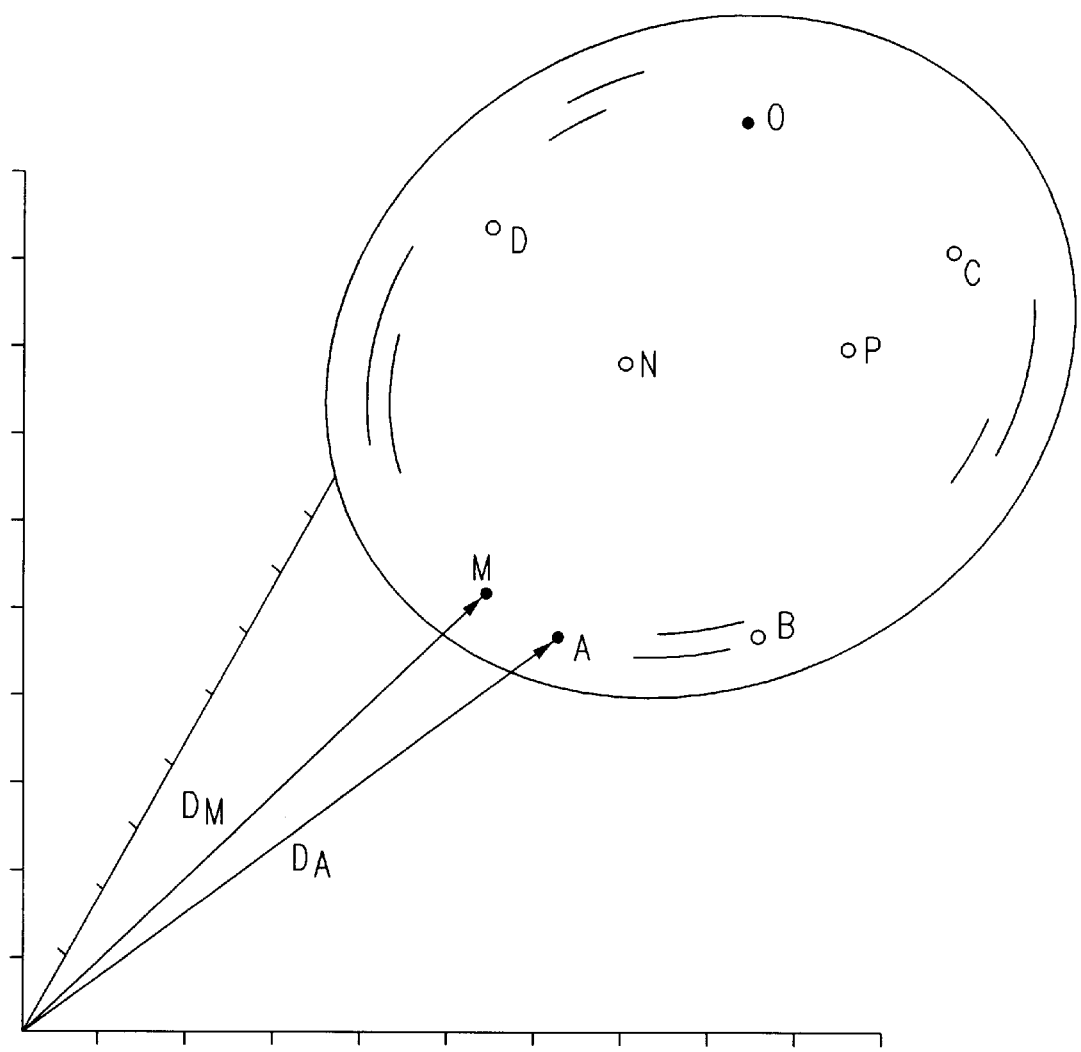
FIG. 4 is a conceptual chart showing a class cluster in N-dimensional Euclidean space.

FIG. 4 shows class cluster 1 after the additional extreme points have been selected using the intra-class extreme point extraction process 230 of this invention. The selected extreme points include additional extreme points M, N, O, and P. The descriptor vectors not selected as extreme points are not included in the final KDB, leaving only extreme points lying on the boundary surface of the class cluster in the KDB. This simplifies the calculations performed by the system in determining whether an unknown defect is nearest to one class cluster or to another.

Referring to FIG. 1D the extreme points in each class cluster undergo a balancing process at step 300. Balancing the extreme points includes eliminating from each class cluster any redundant extreme points. Redundancy is determined by one extreme point's proximity to another extreme point. Redundant extreme points provide essentially no additional discrimination for classifying an unknown defect. By way of operation, in step 301 the similarities across all extreme points in a class cluster are retrieved from the similarity matrix calculated in FIG. 1C at step 205 and are ranked. The extreme point pair having the highest similarity value is identified at step 302. The similarity value between this pair of extreme points is compared at step 304 to a predetermined similarity threshold value, below which the balancing process is terminated. The similarity threshold value may be some minimum predetermined similarity value.

In one embodiment, if the similarity of the identified extreme point pair is higher than the similarity threshold value, each of the extreme points in the identified pair is compared to its next nearest neighbor extreme point at step 305. The extreme point having the highest similarity with its next closest extreme point is discarded, and the extreme point having the lower similarity with its next closest neighbor is retained at step 305. Additional redundant extreme points are identified and discarded by repeating the process beginning at step 301, until the similarity threshold value is met at step 304, whereupon the balancing process is terminated.

Referring to FIG. 4, in the original similarity matrix calculated at step 204 in FIG. 1C, the descriptor vectors $D_A$ and $D_M$ corresponding to extreme point A and extreme point M respectively, were used to calculate a similarity between extreme points A and M. If the similarity between extreme points A and M is greater than the similarity threshold value, for example, then extreme point A and extreme point M are further compared to their respective next nearest neighbor extreme points. For example, in FIG. 4, the next nearest neighbor extreme point to extreme point A is extreme point B. The next nearest neighbor extreme point to extreme point M is extreme point N. The extreme point in the pair having the lowest similarity with respect to its next closest neighbor is retained as in step 305 of FIG. 1D, and the other extreme point discarded.

Upon completing the balancing process, the result is a preliminary KDB wherein each class cluster is an N-dimensional region in N-dimensional Euclidean space and whose surface is defined by a set of dispersed extreme points. Since each extreme point is now capable of classifying an unknown sample using the nearest neighbor rule, the extreme points are hereafter referred to as "rules."

Once the KDB has been balanced, fine tuning the database at step 400 optimizes the accuracy of the KDB in providing the correct classification of an unknown defect. Referring to FIG. 1E, fine tuning includes selecting at step 401 the alternative sub-processes of eliminating bad rules, or adding new rules. Each alternative process may be selected independently, and in any order. Alternatively, the fine tuning process may be skipped and the process stopped at step 459.

If it is decided that a rule is to be deleted, the original training images used to generate the KDB are re-inputted at step 402, but without the pre-determined classification codes. The classification system then assigns a classification code at step 403 to each of the descriptor vectors associated with the training images in accordance with the preliminary KDB by using the nearest neighbor classifier.

At this point in the process, an analysis must be made to determine which descriptor vector received a system-generated classification code different from its original pre-determined classification code. Accordingly, at step 404 the percentage of misclassified points is determined for each rule by comparing the system-generated classification code assigned to each point to its predetermined classification code. The rule having the highest percentage number of misclassified points is identified as the "least accurate rule."

In order to identify the least accurate rule, the similarity values for all of the non-selected points and all of the rules are retrieved from the similarity matrix calculated at step 205 in FIG. 1C. For each rule, points that are classified by that rule according to the nearest neighbor classifier are thereby identified. The system-generated classification codes for those identified points are compared to their predetermined classification codes to provide a percentage of misclassified points (percent accuracy) for that rule. Once the percent accuracy has been calculated for each rule, all of the rules are ranked at step 405 according to their percent accuracies. The least accurate rule (the rule having the highest percentage of misclassified points) is selected at step 406.

The accuracy of the least accurate rule is compared to a predetermined accuracy threshold value at step 411. If the accuracy of the least accurate rule is less than the accuracy threshold value, the least accurate rule is deselected as an extreme point at step 407. After the least accurate rule has been deselected, the system accuracy is re-calculated at step 408 using the updated KDB to classify all of the training images. The system accuracy is the percentage ratio of the number of misclassified points, as determined by comparing the newly system-generated classification codes to their original classification codes, to the total number of training points. The new system accuracy, after deleting the least accurate rule, is compared to the system accuracy prior to deleting the least accurate rule to determine whether the system accuracy has improved at step 409. If the system accuracy has improved, and the system accuracy threshold value has not yet been achieved (as determined at step 410), then a decision must be made at step 401 whether to delete another rule, add a rule, or stop the fine tuning process.

If the system accuracy threshold has been achieved the fine tuning process is halted at step 459. If no improvement in the system accuracy is discerned by deleting the least accurate rule, the least accurate rule is re-selected at step 451, and a decision must be made at step 401 whether to delete another rule, add a rule, or stop the fine tuning process.

Where a decision at step 401 is made to add a new rule, the training images are re-inputted and classified at steps 402 and 403 as described above. At step 451, the degree of misclassification for each misclassified point is determined by the similarity between the misclassified point and the corresponding rule responsible for that point's misclassification. The most misclassified point is identified at step 452, and is defined as the misclassified point having the highest similarity between it and the rule responsible for its misclassification.

The most misclassified point is selected as a new rule and is inserted into the current KDB retaining its original classification code at step 455. By so doing, this new rule extends the boundary surface of its original classification, thereby ensuring that a correct classification is made in the event a descriptor vector of an unknown defect close to those points is inputted for clarification. The system accuracy is re-calculated at step 408 as described above using the updated KDB including the newly added rule. If the system accuracy has improved as determined at step 409, a determination is made at step 410 whether or not the system accuracy threshold has been achieved. If the system accuracy threshold has not been achieved, then a decision must be made at step 401 whether to delete a rule, add another rule, or stop the fine tuning process.

If upon the addition of a new rule the system determines at step 409 that the accuracy is not improving, the newly added rule is de-selected and removed from the current KDB at step 458, and a decision must be made at step 401 whether to delete a rule, add another rule, or stop the fine tuning process.

If the system accuracy threshold has been achieved then the fine tuning may be stopped at step 459.

In view of the foregoing it will be understood that the present invention provides a method for automatically generating a KDB in a computer system having pattern recognition capability for the purpose of classifying objects according to predetermined classification codes, and without the subjectivity introduced by direct coding. It will also be evident that the method used to generate the KDB as described in the foregoing disclosure may be applied to any object that may be classified according to a set of N quantitative descriptors to provide an N-dimensional descriptor vector capable of being represented as a point in a virtual N-dimensional Euclidean space. It will also be evident that the method of this invention for automatically generating a KDB includes balancing and fine tuning process steps that may be used in an on going protocol to maintain and update the KDB. It will also be evident that the method of this invention permits a supervised learning mode whereby the fine tuning may be performed under the supervision of a human operator or technician, or an unsupervised learning mode whereby the fine tuning process of the method of this invention is performed entirely by the computer system itself. It will also be evident that the automatic knowledge database generation method of this invention provides a KDB whereby each classification may be conceptualized as a class cluster in N-dimensional Euclidean space, each class cluster defined by rules, or extreme points, defining the class cluster boundary, with all interior descriptor vectors having been discarded, thus providing a KDB whereby only those points needed to make the classification determination are retained, thus improving the efficiency, and performance of the classification system.

What is claimed is:

1. An object classification system having a computer, a digital image data source, a machine readable pattern recognition code encoded in the computer for interpreting digital image data and for characterizing images represented by the digital image data from said digital image source as a multi-dimensional descriptor vector for classification of objects using a knowledge database, and a machine readable code for automatically generating the knowledge database, the classifier comprising:

a) a memory which stores in computer readable form a plurality of descriptor vectors derived from a plurality of training images, each respective one of the training images including a predetermined classification code to permit separating the descriptor vectors into a plurality of class clusters;

b) a similarity matrix stored in a computer memory, said similarity matrix containing similarity values as between all of said descriptor vectors to permit identifying a first least similar descriptor vector and a most similar descriptor vector in each class cluster as compared to all other class clusters to thereby provide at least two inter-class extreme points for each class cluster, and to permit identifying a second least similar descriptor vector from a selected extreme point within a class cluster to thereby permit selecting said least similar descriptor vector as an intra-class extreme point;

c) an extreme point balancer which eliminates redundant extreme points from a class cluster.

2. An object classification system as in claim 1 wherein said extreme point balancer discards a first extreme point most similar to a second extreme point according to a predetermined similarity threshold value.

3. An object classification system as in claim 1 further comprising a knowledge database fine tuner which increases the accuracy of the knowledge database by deleting extreme points that are least accurate in their ability to classify an unknown sample, adding additional extreme points that represent most misclassified descriptor vectors thereby improving the ability of the knowledge database to correctly classify an object.

4. An object classification system as in claim 3 wherein said fine tuner compares each of said predetermined classification codes assigned to each of the training images to a corresponding system-generated classification code for each of the training images to thereby identify an extreme point least accurate in its ability to classify an unknown image, and to thereby permit de-selecting said least accurate extreme point.

5. An object classification system as in claim 3 wherein said comparison of classification codes and said similarity matrix permit identifying a most misclassified descriptor vector to thereby permit adding said most misclassified descriptor vector to the knowledge database as a new extreme point.

6. A method for automatically generating a knowledge database in a classification system having a computer, a computer memory, a digital image data source, and a machine readable code for automatically generating a knowledge database, the method comprising the steps of:

a) characterizing digital image data from the digital image data source representing a plurality of training images and having a predetermined classification code for each respective one of the plurality of images, to provide a plurality of descriptor vectors separated by said predetermined classification codes into a plurality of class clusters stored in the computer memory;

b) calculating a similarity matrix across all the descriptor vectors to permit identifying a most similar descriptor vector and a first least similar descriptor vector in each class cluster as compared to descriptor vectors in all other class clusters thereby providing at least two inter-class extreme points for each class cluster;

c) identifying a second least similar descriptor vector in a class cluster as compared to a selected extreme point in the same class cluster to permit selecting said second least similar descriptor vector as an intra-class extreme point;

d) balancing said extreme points to eliminate redundant extreme points and to thereby define a preliminary knowledge database; and e) fine tuning the preliminary knowledge database to improve the accuracy of the preliminary knowledge database to provide a knowledge database, said knowledge database being stored in a computer memory.

7. A method for automatically generating a knowledge database in a classification system as in claim 6 wherein said balancing step includes the step of deleting a first extreme point most similar to a second extreme point according to a predetermined similarity threshold.

8. A method for automatically generating a knowledge database in a classification system as in claim 6 wherein said fining tuning step comprises the steps of:

a) providing a system-generated classification code for each of said descriptor vectors representing the plurality of training images;

b) comparing each respective one of said system-generated classification codes to a corresponding one of said predetermined classification codes thereby identifying misclassified descriptor vectors;

c) identifying a least accurate extreme point having associated therewith the highest percentage of misclassified descriptor vectors; and d) deleting said least accurate extreme point.

9. A method for automatically generating a knowledge database in a classification system as in claim 6 wherein said fine tuning step further comprises the steps of:

a) providing a system-generated classification codes for each of said descriptor vectors representing the plurality of training images;

b) comparing each respective one of said system-generated classification codes to a corresponding one of said predetermined classification codes thereby identifying misclassified descriptor vectors;

c) identifying a most misclassified descriptor vector; and d) adding said most misclassified descriptor vector to the knowledge database as a new extreme point.

10. An object classification system, comprising a computer useable medium having a computer readable program code means embodied therein for causing the object classification system to automatically generate a knowledge database for classifying unknown objects, the computer readable program code means in the object classification system comprising:

a) computer readable code means for causing a computer to retrieve a plurality of descriptor vectors and predetermined classification codes from a computer memory, each of said descriptor vectors representing a training image, each of said descriptor vectors further comprising a plurality of numerical values corresponding to physical parameters used to characterize an object image, said descriptor vectors separated by said predetermined classification codes into a plurality of class clusters;

b) computer readable program code means for causing the computer to calculate a similarity matrix across all said descriptor vectors to permit selecting as extreme points a most similar descriptor vector and a first least similar descriptor vector in each class cluster as compared to descriptor vectors in all other class clusters;

c) computer readable program code means for causing the computer to select a second least similar descriptor vector in a class cluster as compared to a selected extreme point in the same class cluster to thereby provide an intra-class extreme point; and d) computer readable program code means for causing the computer to delete at least one of a first extreme point most similar to a second extreme point according to a predetermined similarity threshold to thereby provide a preliminary knowledge database.

11. An object classification system as in claim 10 wherein said computer readable program code means in the object classification system further comprises:

a) computer readable code means for causing the computer to fine tune said preliminary knowledge database by calculating a system-generated classification code for each of said descriptor vectors representing the plurality of training images, comparing each respective one of said system-generated classification codes to a corresponding one of said predetermined classification codes thereby identifying misclassified descriptor vectors, identifying a least accurate extreme point having associated therewith the highest percentage of misclassified descriptor vectors, and deleting said least accurate extreme point.

12. An object classification system as in claim 10 wherein said computer readable program code means in the object classification system further comprises:

a) computer readable code means for causing the computer to fine tune said preliminary knowledge database by calculating a system-generated classification codes for each of said descriptor vectors representing the plurality of training images, comparing each respective one of said system-generated classification codes to a corresponding one of said predetermined classification codes thereby identifying misclassified descriptor vectors, identifying a most misclassified descriptor vector, and adding said most misclassified descriptor vector to the knowledge database as a new extreme point.

13. A program storage device readable by a machine tangibly embodying a program of instructions executable by the machine to perform method steps for automatically generating a knowledge database for object classification, said method steps comprising:

a) characterizing digital image data from a digital image data source representing a plurality of training images and having a predetermined classification code for each respective one of the plurality of images, to provide a plurality of descriptor vectors separated by said predetermined classification codes into a plurality of class clusters stored in a computer memory;

b) calculating a similarity matrix across all the descriptor vectors to permit identifying a most similar descriptor vector and a first least similar descriptor vector in each class cluster as compared to descriptor vectors in all other class clusters thereby providing at least two inter-class extreme points for each class cluster;

c) identifying a second least similar descriptor vector in a class cluster as compared to a selected extreme point in the same class cluster to permit selecting said second least similar descriptor vector as an intra-class extreme point;

d) balancing said extreme points to eliminate redundant extreme points and to thereby define a preliminary knowledge database; and e) fine tuning the preliminary knowledge database to improve the accuracy of the preliminary knowledge database to provide a knowledge database, said knowledge database being stored in a computer memory.

14. A program storage device as in claim 13 wherein said balancing step further comprises the step of deleting at least one of a first extreme point most similar to a second extreme point according to a predetermined similarity threshold.

15. A program storage device as in claim 13 wherein said fine tuning step further comprises the steps of:

a) providing a system-generated classification code for each of said descriptor vectors representing the plurality of training images;

b) comparing each respective one of said system-generated classification codes to a corresponding one of said predetermined classification codes thereby identifying misclassified descriptor vectors;

c) identifying a least accurate extreme point having associated therewith the highest percentage of misclassified descriptor vectors; and d) deleting said least accurate extreme point.

16. A program storage device as in claim 13 wherein said fine tuning step further comprises the steps of:

a) providing a system-generated classification code for each of said descriptor vectors representing the plurality of training images;

b) comparing each respective one of said system-generated classification codes to a corresponding one of said predetermined classification codes thereby identifying misclassified descriptor vectors;

c) identifying a most misclassified descriptor vector; and d) adding said most misclassified descriptor vector to the knowledge database as a new extreme point.

* * * * *